(12) United States Patent
Siomina et al.

(10) Patent No.: US 10,299,312 B2
(45) Date of Patent: May 21, 2019

(54) MANAGING TRANSITIONS BETWEEN DIFFERENT USER EQUIPMENT ACTIVITY CONFIGURATIONS

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 15/326,598

(22) PCT Filed: Oct. 12, 2016

(86) PCT No.: PCT/SE2016/050983
§ 371 (c)(1),
(2) Date: Jan. 16, 2017

(87) PCT Pub. No.: WO2017/065677
PCT Pub. Date: Apr. 20, 2017

(65) Prior Publication Data
US 2017/0273136 A1 Sep. 21, 2017

Related U.S. Application Data

(60) Provisional application No. 62/241,526, filed on Oct. 14, 2015.

(51) Int. Cl.
*H04W 76/28* (2018.01)
*H04W 52/02* (2009.01)
(Continued)

(52) U.S. Cl.
CPC .......... *H04W 76/28* (2018.02); *H04W 24/10* (2013.01); *H04W 52/0216* (2013.01);
(Continued)

(58) Field of Classification Search
None
See application file for complete search history.

(56) References Cited

U.S. PATENT DOCUMENTS

2009/0238098 A1 9/2009 Cai et al.
2013/0301421 A1 11/2013 Yi et al.
(Continued)

FOREIGN PATENT DOCUMENTS

EP 2 519 060 A1 10/2012

OTHER PUBLICATIONS

International Search Report, Application No. PCT/SE2016/050983, dated Dec. 15, 2016.
(Continued)

*Primary Examiner* — Donald L Mills
(74) *Attorney, Agent, or Firm* — Sage Patent Group

(57) ABSTRACT

A method performed by a UE of a telecommunications system includes obtaining a first UE activity configuration and obtaining a second UE activity configuration. An activity and/or inactivity duration defined by the first UE activity configuration is different than an activity and/or inactivity duration defined by the second activity configuration. A transition is performed between the UE using the first UE activity configuration and the UE using the second UE activity configuration. The method further includes adapting one or more operations started or being performed under the first UE activity configuration being used just before the transition. The adapting is based on at least one of: the type of operation, activity and/or inactivity level of the first UE activity configuration and/or of the second UE activity configuration, and a relation between the first UE activity configuration and the second UE activity configuration.

23 Claims, 7 Drawing Sheets

(51) Int. Cl.
*H04W 24/10* (2009.01)
*H04W 68/02* (2009.01)

(52) U.S. Cl.
CPC ............. *H04W 68/02* (2013.01); *Y02D 70/00* (2018.01); *Y02D 70/1242* (2018.01); *Y02D 70/1262* (2018.01); *Y02D 70/142* (2018.01); *Y02D 70/21* (2018.01); *Y02D 70/24* (2018.01)

(56) References Cited

U.S. PATENT DOCUMENTS

| | | | | |
|---|---|---|---|---|
| 2014/0003311 | A1* | 1/2014 | Chin | H04W 52/0254 370/311 |
| 2014/0073306 | A1* | 3/2014 | Shetty | H04W 36/0088 455/418 |
| 2014/0247742 | A1* | 9/2014 | Lee | H04W 52/0216 370/252 |
| 2014/0286215 | A1* | 9/2014 | Koc | H04W 28/24 370/311 |
| 2014/0321343 | A1* | 10/2014 | Gupta | H04W 4/70 370/311 |
| 2015/0098381 | A1* | 4/2015 | Cucala | H04W 52/0216 370/311 |
| 2015/0215989 | A1* | 7/2015 | Bangolae | H04W 52/0251 370/311 |
| 2015/0237577 | A1* | 8/2015 | Zhang | H04W 4/70 370/311 |

OTHER PUBLICATIONS

3GPP, Technical Specification—"3rd Generation Partnership Project; Technical Specification Group Radio Access Network; Physical layer; Measurements (FDD) (Release 13)"; 3GPP TS 25.215 V13.1.0 (Jun. 2016), 25 pp.

3GPP, Technical Specification—"3rd Generation Partnership Project; Technical Specification Group Radio Access Network; Evolved Universal Terrestrial Radio Access (E-UTRA); Physical layer; Measurements (Release 14)", 3GPP TS 36.214 V14.0.0 (Sep. 2016), 20 pp.

* cited by examiner

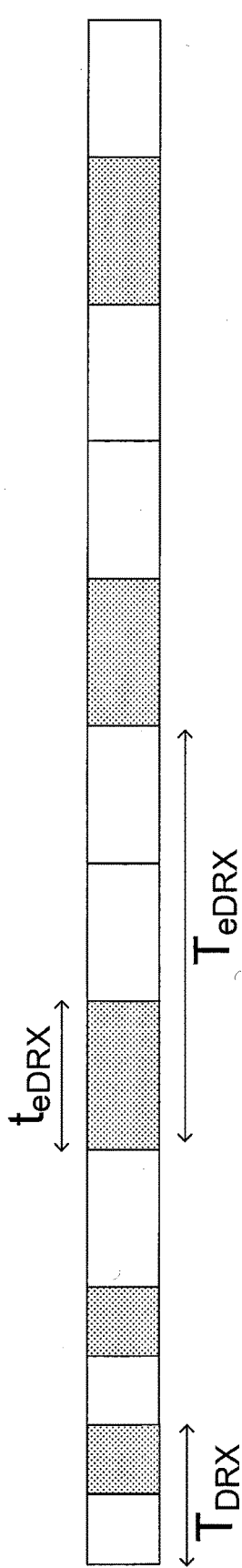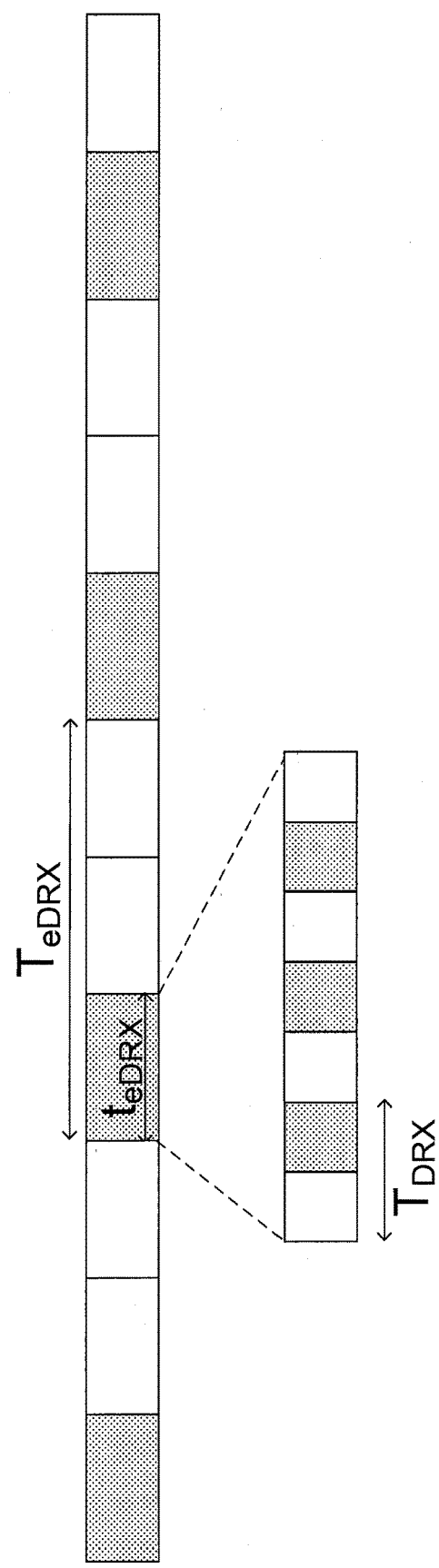
Fig. 1a
Fig. 1b

MANAGING TRANSITIONS BETWEEN DIFFERENT USER EQUIPMENT ACTIVITY CONFIGURATIONS

CROSS REFERENCE TO RELATED APPLICATIONS

The present Application is a 35 U.S.C. § 371 national stage application of PCT International Application No. PCT/SE2016/050983, filed on Oct. 12, 2016, which itself claims the benefit of priority from U.S. Provisional Application No. 62/241,526 filed Oct. 14, 2015, the disclosures of both of which are hereby incorporated herein in their entireties by reference.

TECHNICAL FIELD

The present disclosure relates to methods and operations by network nodes and user equipments in a telecommunications system.

BACKGROUND

1. Extended Discontinuous Reception (eDRX)

Minimizing power consumption is important for user equipments (UEs) using battery or an external power supply and obtains increased importance in view of the rapid projected growth of device populations and more demanding use cases.

An example of the importance of managing power consumption is illustrated by a scenario for machine-to-machine (M2M) use cases with sensors that run on batteries and where a significant cost is incurred for site exchange (or charge) of the batteries for a large amount of devices. Moreover, the battery lifetime may determine the device's lifetime if the battery is not properly charged or replaced. Even for scenarios where UEs consume power from an external power supply, it is desirable to minimize power consumption for energy efficiency purposes.

Enhancing discontinuous reception (DRX) operation, currently discussed in 3GPP, is a way to improve battery saving in a UE. DRX operation makes the UE reachable during pre-defined occasions without using unnecessary signaling between the UE and a network node. As currently defined, DRX cycles in LTE can be at most 2.56 seconds and thus would not allow for sufficient power savings for UEs that only need to wake-up infrequently (e.g. every few or tens of minutes) for data acquisition and/or communication. Hence, DRX cycle extension code enable significant battery savings and allow more flexible operational timing for such UEs. Furthermore, the DRX cycle can be set dependent on the data delay tolerance and power saving requirements of the system, thus providing a flexible solution for achieving significant UE battery savings.

Currently, 3GPP is defining enhanced or extended DRX (eDRX) operation for UEs in CONNECTED mode in Long-Term Evolution (LTE) and for UEs in IDLE mode in LTE and UMTS Terrestrial Radio Access ((UTRA). In LTE, the eDRX in IDLE is based on the Hyper-System Frame Number (H-SFN) concept.

1.1 eDRX in CONNECTED Mode in LTE

Although the eDRX concept remains unclear for CONNECTED mode, the DRX cycle has been extended up to 10.24 s. FIGS. 1a and 1b illustrate operations and timing for how the DRX cycle has been extended for a UE in CONNECTED mode.

1.2 DRX in Idle Mode in LTE

H-SFN provides operations to extend the current SFN range which is limited to 0 to 1023, such as illustrated by the operations and timing shown in the FIG. 2a. For example, 10 bits of extension are used where each hyper SFN contains 1024 SFNs, and therefore spans across 10.24 seconds. However, the actual H-SFN range is still not decided.

For extended idle mode DRX, the paging frames for the UE can consist of the following:

1) H-SFN value or values: that provide the hyper frame/frames at which the UE may be paged, i.e., the paging hyper-frames (PH); and 2) SFN value or values: that provide the legacy frame/frames at which the UE expects to be paged within each paging hyper-frame. The legacy paging frames are within a paging window (PW), which is also referred to herein as a Paging Transmission Window (PTW), which is illustrated by the operations and timing shown in FIG. 2b.

1.3 eDRX in UTRA

In eDRX for UTRA (for IDLE UEs), the DRX cycle is prolonged to some seconds which is much longer than the legacy DRX cycles. The DRX cycle consists of a long sleep period, then the UE wakes up to the PTW where there are N_PTW paging occasions with the legacy PS DRX cycle. Associated operations and timing are shown in FIG. 3.

2.0 (Normal) DRX in LTE 2.1 General Principles

In LTE, DRX has been introduced as one of the key solutions to conserve battery power in mobile terminal. DRX is characterized by the following:

Per UE mechanism (as opposed to per radio bearer);

May be used in RRC_IDLE and RRC_CONNECTED; In RRC_CONNECTED, the eNodeB/UE may initiate the DRX mode when there are no outstanding/new packets to be transmitted/received; in RRC_IDLE a 2G and 3G terminal (UE) uses discontinuous reception in idle state to increase battery life time. HSPA and LTE have introduced DRX also for connected state Available DRX values are controlled by the network and start from non-DRX up to x seconds.

Hybrid ARQ (HARQ), or Hybrid Automatic Repeat Request, operation related to data transmission is independent of DRX operation and the UE wakes up to read the PDCCH for possible retransmissions and/or ACK/NAK signalling regardless of DRX In the downlink, a timer is used to limit the time the UE stays awake awaiting a retransmission;

When DRX is configured, the UE may be further configured with an "on-duration" timer during which time the UE monitors the PDCCHs for possible allocations;

When DRX is configured, periodic CQI reports can only be sent by the UE during the "active-time". RRC can further restrict periodic CQI reports so that they are only sent during the on-duration; and eNodeB does not transmit packets to UE during the sleep mode.

DRX is further characterized by that in RRC_CONNECTED mode the DRX should not be mixed up with DRX in idle mode which the mobile is set into after a prolonged time of air interface inactivity. DRX in idle mode is also known as paging DRX, i.e. the time the mobile device can go to sleep between two paging messages which could contain a command for the mobile to wake up again and change back to RRC_CONNECTED state. The DRX in idle mode or connected mode is much less fine grained and measured in hundreds of milliseconds or even seconds.

2.2 Parameters Related to DRX

The definitions described below apply to DRX in E-UTRAN.

The phrase "On-duration" means duration in downlink subframes that the UE waits for, after waking up from DRX, to receive PDCCHs. If the UE successfully decodes a PDCCH, the UE stays awake and starts the inactivity timer.

The phrase "inactivity-timer" means duration in downlink subframes that the UE waits to successfully decode a PDCCH, from the last successful decoding of a PDCCH, failing which it re-enters DRX. The UE restarts the inactivity timer following a single successful decoding of a PDCCH for a first transmission only (i.e. not for retransmissions).

The phrase "active-time" means total duration that the UE is awake. This includes the "on-duration" of the DRX cycle, the time the UE is performing continuous reception while the inactivity timer has not expired and the time the UE is performing continuous reception while waiting for a DL retransmission after one HARQ RTT. Based on the above the minimum active time is of length equal to on-duration, and the maximum is undefined (e.g., infinite).

Of the above parameters, the on-duration and inactivity-timer are of fixed lengths, while the active-time is of varying lengths based on scheduling decision and UE decoding success. Only on-duration and inactivity-timer duration are signalled to the UE by the eNodeB, so that there is only one DRX configuration applied in the UE at any time, and the UE applies an on-duration on wake-up from DRX sleep. Associated operations and timing for DRX mode in LTE are shown in FIG. 4.

DRX is triggered by means of an inactivity time known as DRX. As can be seen from FIG. 4, the UE activity time may be extended if PDCCH is received during ON Duration time. However, it may also be shortened by a MAC DRX command, upon reception of which the UE stops onDurationTimer and drx-InactivityTimer.

If PDCCH has not been successfully decoded during the on-duration, the UE follows the DRX configuration (i.e. the UE can enter DRX sleep if allowed by the DRX configuration). This applies also for the sub-frames where the UE has been allocated predefined resources. If it successfully decodes a PDCCH for a first transmission, the UE stays awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules:

1) If a short DRX cycle is configured, the UE first follows the short DRX cycle and after a longer period of inactivity the UE follows the long DRX cycle; if short DRX cycle is used, the long cycle will be a multiple of the short cycle. Durations for long and short DRX are configured by the RRC. The transition between the short and long DRX cycles is determined by the eNodeB Medium Access Control (MAC) commands (if the command is received and short DRX is configured, the UE will (re)start drxShortCycleTimer and use the Short DRX Cycle; otherwise long DRX will be used) or by the UE based on an activity timer; and 2) Else, if a short DRX cycle is not configured, the UE follows the long DRX cycle directly.

Some parameters of a UE activity configuration that may be set by the network include the following:

onDurationTimer can be (in PDCCH subframes): 1, 2, 3, 4, 5, 6, 8, 10, 20, 30, 40, 50, 60, 80, 100, and 200;

drx-InactivityTimer can be (in PDCCH subframes): 1, 2, 3, 4, 5, 6, 8, 10, 20, 30, 40, 50, 60, 80, 100, 200, 300, 500, 750, 1280, 1920, 2560. A specific value may also be configured if the UE supports IDC (in-device co-existence);

longDRX-CycleStartOffset (in subframes): depending on the cycle length, but up to 2559; and shortDRX-cycle (in subframes): 2, 5, 8, 10, 16, 20, 32, 40, 64, 80, 128, 160, 256, 320, 52, 640.

2.3 UE Active Time and UE Transmissions when Using DRX

When a DRX cycle is configured, the Active Time includes the time while:

onDurationTimer, drx-InactivityTimer, drx-RetransmissionTimer or mac-ContentionResolutionTimer is running; or a Scheduling Request is sent on PUCCH and is pending; or an uplink grant for a pending HARQ retransmission can occur and there is data in the corresponding HARQ buffer; or a PDCCH indicating a new transmission addressed to the C-Radio Network Temporary Identity (C-RNTI) of the UE has not been received after successful reception of a Random Access Response for the preamble not selected by the UE.

Generally, new transmissions can only take place during the active-time (so that when the UE is waiting for one retransmission only, it does not have to be "awake" during the RTT).

When not in Active Time, type-0-triggered Sounding Reference Signal (SRS) is not reported.

If CQI masking (cqi-Mask) is setup by upper layers, the operations include:

when onDurationTimer is not running, CQI/PMI/RI/PTI on PUCCH is not reported, else, when onDurationTimer is not running, when not in Active Time, CQI/PMI/RI/PTI on PUCCH is not reported.

That is, cqi-Mask is effectively limiting CQI/PMI/PTI/RI reports to the on-duration period of the DRX cycle, and the same one value applies for all serving cells (the associated functionality is common i.e. not performed independently for each cell).

There are a few exceptions, regardless of whether the UE is monitoring PDCCH or not, the UE receives and transmits HARQ feedback and transmits type-1-triggered SRS when such is expected. A UE may optionally choose to not send Channel Quality Indicator (CQI)/Precoding Matrix Indicator (PMI)/Rank Indication (RI)/Precoding Type Indicator (PTI) reports on PUCCH and/or type-0-triggered SRS transmissions for up to 4 subframes following a PDCCH indicating a new transmission (UL or DL) received in subframe n−i, where n is the last subframe of Active Time and i is an integer value from 0 to 3. After Active Time is stopped due to the reception of a PDCCH or a MAC control element a UE may optionally choose to continue sending CQI/PMI/RI/PTI reports on PUCCH and/or SRS transmissions for up to 4 subframes. The choice not to send CQI/PMI/RI/PTI reports on PUCCH and/or type-0-triggered SRS transmissions is not applicable for subframes where onDurationTimer is running and is not applicable for subframes n−i to n.

3. Potential Problems with Existing Approaches

In existing approaches, the extended DRX (e.g. eDRX) can be very long with a DRX cycle length of one or few minutes to one or more hours. Furthermore, the paging window, also referred to herein as PTW, (analogous to ON duration in legacy DRX cycle) can be very long and also very different compared to the legacy DRX where ON duration can be in the order of 1-30 ms.

Moreover, due to the very different characteristics of the legacy DRX and eDRX cycles, the requirements with the new long DRX cycles may be quite different from those for legacy DRX cycles. Furthermore, the UE behavior is not specified and therefore unpredictable when the DRX configuration changes to eDRX. The lack of well-defined UE behavior may result in that the UE operation when switching between eDRX and legacy DRX cycles is disrupted or interrupted over an unpredictable time. This in turn may degrade the measurement performance of the radio measurements performed by the UE. This may also result in loss of scheduling grant and can degrade the UE and system performance (e.g. loss of throughput).

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments disclosed herein are directed to a method performed by a UE of a telecommunications system. The method includes obtaining a first UE activity configuration and obtaining a second UE activity configuration. An activity and/or inactivity duration defined by the first UE activity configuration is different than an activity and/or inactivity duration defined by the second activity configuration. A transition is performed between the UE using the first UE activity configuration and the UE using the second UE activity configuration. The method further includes adapting one or more operations started or being performed under the first UE activity configuration being used just before the transition. The adaptation is based on at least one of: the type of operation, activity and/or inactivity level of the first UE activity configuration and/or of the second UE activity configuration, and a relation between the first UE activity configuration and the second UE activity configuration.

A potential advantage provided by these embodiments is they allow a network node (e.g. serving network node) to be aware of UE activity level and performance when doing transition from one UE activity configuration to another UE activity configuration. The methods may ensure that the UE meets at least certain performance requirements of one or more operations occurring during, before or after transition from one UE activity configuration to another UE activity configuration. The methods may ensure consistent UE behavior related to one or more operations occurring during, before or after the transition from one UE activity configuration to another UE activity configuration. Data transmitted to the UE and/or transmitted by the UE may thereby not be lost or the loss can be minimized during, before or after the transition from one UE activity configuration to another UE activity configuration.

In some further embodiments, the adaptation includes, during a defined time period while performing the transitioning of the UE between the first UE activity configuration and the second UE activity configuration, performing the one or more operations by the UE according to a most relaxed requirement out of a first requirement associated with the first UE activity configuration and a second requirement associated with the second UE activity configuration. In a further embodiment, following the defined time period the UE operates according to the second requirement associated with the second UE activity configuration.

Some other embodiments are directed to a UE operating in a telecommunications system. The UE includes a transceiver configured to provide radio communications with a network node of the telecommunications system, and processor coupled to the transceiver. The processor is configured to obtain a first UE activity configuration and obtain a second UE activity configuration. An activity and/or inactivity duration defined by the first UE activity configuration is different than an activity and/or inactivity duration defined by the second activity configuration. The processor is further configured to perform a transition between the UE using the first UE activity configuration and the UE using the second UE activity configuration, and to adapt one or more operations started or being performed under the first UE activity configuration being used just before the transition, which adaptation is based on at least one of: the type of operation, activity and/or inactivity level of the first UE activity configuration and/or of the second UE activity configuration, and a relation between the first UE activity configuration and the second UE activity configuration.

Some other embodiments are directed to a UE operating in a telecommunications system. The UE includes a first UE activity configuration obtaining module, a second UE activity configuration obtaining module, a UE activity configuration transition module, and a UE operation adaptation module. The first UE activity configuration module is configured to obtain a first UE activity configuration defining an activity and/or inactivity duration that is less than or equal to a threshold. The second UE activity configuration obtaining module is configured to obtain a second UE activity configuration defining an activity and/or inactivity duration that is different than the activity and/or inactivity duration defined by the first UE activity configuration. The UE activity configuration transition module is configured to perform a transition between the UE using the first UE activity configuration and the UE using the second UE activity configuration. The UE operation adaptation module is configured to adapt one or more operations started or being performed under the first UE activity configuration being used just before the transition, which adaptation is based on at least one of: the type of operation, activity and/or inactivity level of the first UE activity configuration and/or of the second UE activity configuration, and a relation between the first UE activity configuration and the second UE activity configuration.

Some other embodiments are directed to a method by a network node serving a UE in a telecommunications system. The method includes configuring the UE with a first UE activity configuration and configuring the UE with a second UE activity configuration. An activity and/or inactivity duration defined by the first UE activity configuration is different than an activity and/or inactivity duration defined by the second activity configuration. The method further includes controlling a transition at the UE between the first UE activity configuration and the second UE activity configuration for enabling the UE to adapt one or more operations started or being performed under the first UE activity configuration being used just before the transition, which controlling of the adaptation is based on at least one of: the type of operation, activity or inactivity level of the first UE activity configuration and/or of the second UE activity configuration, and a relation between the first UE activity configuration and the second UE activity configuration.

Some other embodiments are directed to network node serving a UE in a telecommunications system. The network node includes a transceiver configured to provide radio communications with the UE of the telecommunications system, and a processor coupled to the transceiver. The processor is configured to configure the UE with a first UE activity configuration and configure the UE with a second UE activity configuration. An activity and/or inactivity duration defined by the first UE activity configuration is different than an activity and/or inactivity duration defined by the second activity configuration. The processor is further configured to control a transition at the UE between the first UE activity configuration and the second UE activity configuration for enabling the UE to adapt one or more operations started or being performed under the first UE activity configuration being used just before the transition, which controlling of the adaptation is based on at least one of: the type of operation, activity or inactivity level of the first UE activity configuration and/or of the second UE activity configuration, and a relation between the first UE activity configuration and the second UE activity configuration.

Some other embodiments are directed to network node serving a UE in a telecommunications system. The network node includes a first UE activity configuration module, a second UE activity configuration module, and a UE activity configuration transition module. The first UE activity configuration module configures the UE with a first UE activity configuration and configures the UE with a second UE activity configuration. An activity and/or inactivity duration defined by the first UE activity configuration is different than an activity and/or inactivity duration defined by the second activity configuration. The UE activity configuration transition module controls a transition at the UE between the first UE activity configuration and the second UE activity configuration for enabling the UE to adapt one or more operations started or being performed under the first UE activity configuration being used just before the transition, which controlling of the adaptation is based on at least one of: the type of operation, activity or inactivity level of the first UE activity configuration and/or of the second UE activity configuration, and a relation between the first UE activity configuration and the second UE activity configuration Other methods by UEs, UEs, methods by network nodes, and network nodes according to embodiments will be or become apparent to one with skill in the art upon review of the following drawings and detailed description. It is intended that all such additional methods, resource management computer nodes, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 1a and 1b illustrate a timing diagram showing operations for how DRX cycle have been extended for a UE in CONNECTED mode;

DETAILED DESCRIPTION

4. Introduction

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Some embodiments of the present disclosure are directed to methods in a UE and related methods in a network node.

Figure 2A:
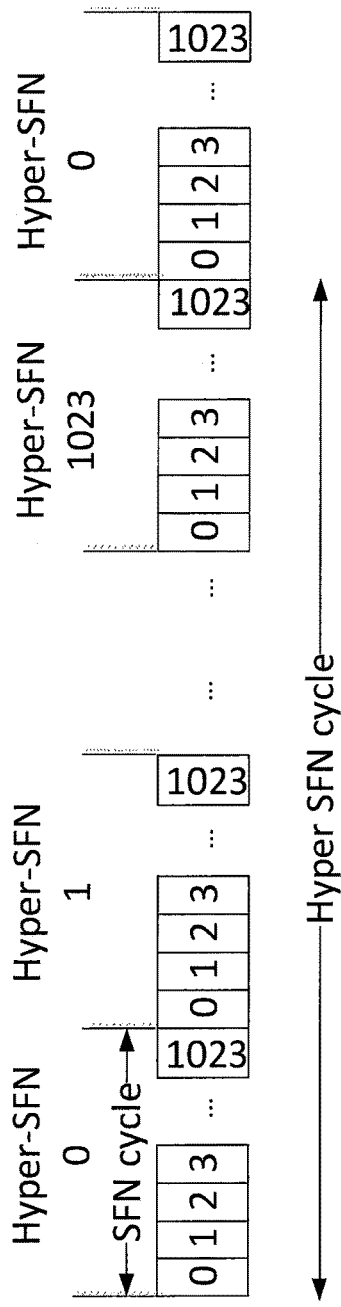
FIG. 2a illustrates a timing diagram showing operations during H-SFN to extend SFN range.
Figure 2B:
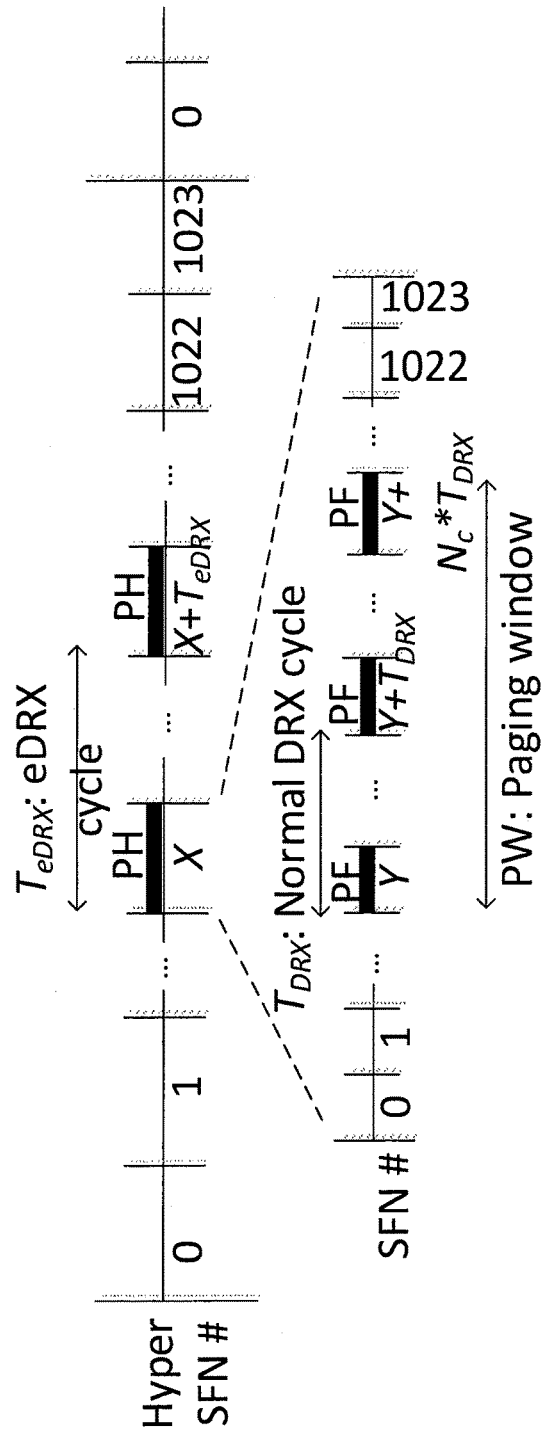
FIG. 2b illustrates a timing diagram showing operations during SFN in which legacy paging frames are within a paging window (PW)
Figure 3:
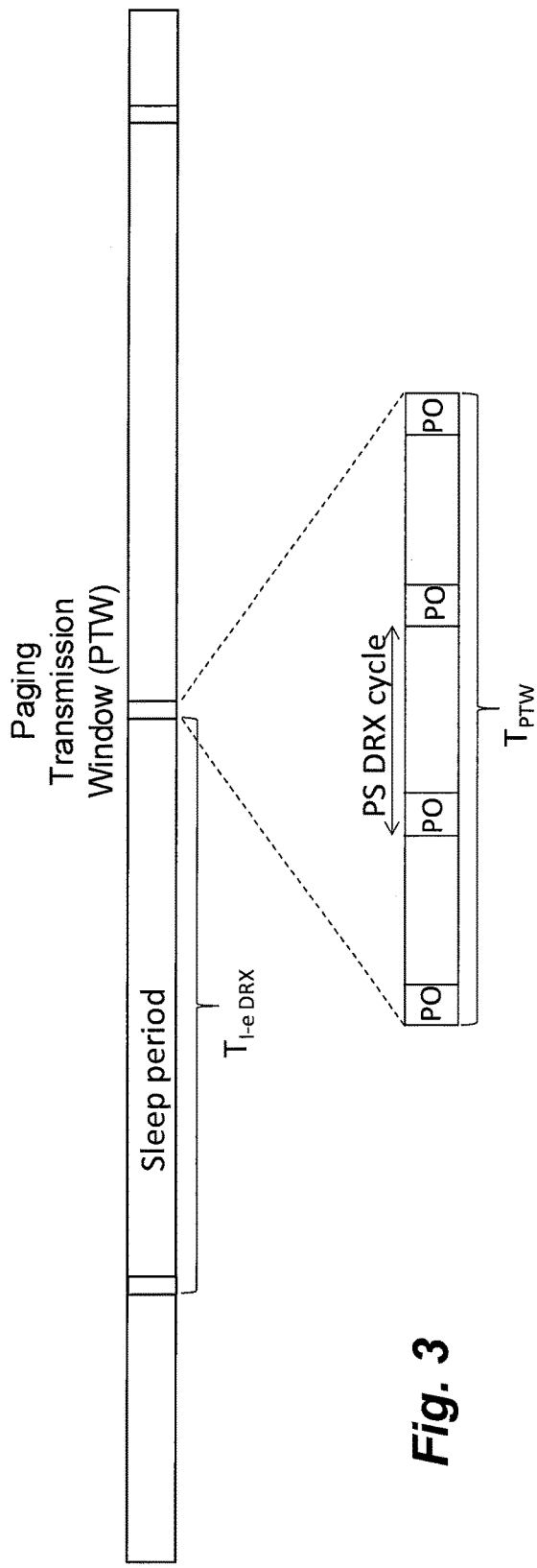
FIG. 3 illustrates a timing diagram showing operations in which a DRX cycle consists of a long sleep period, then the UE wakes up to a Paging Transmission Window where there are N_PTW paging occasions with the legacy PS DRX cycle.
Figure 4:
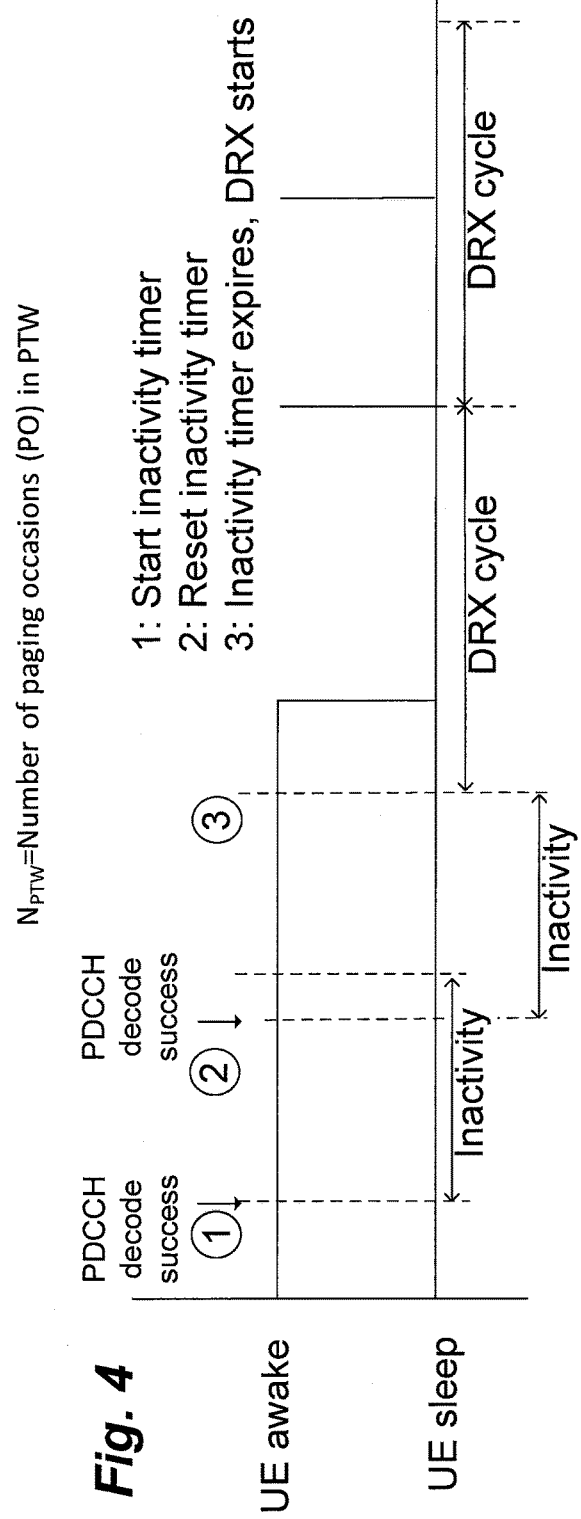
FIG. 4 illustrates a timing diagram showing operations for DRX mode in LTE.
Figure 5:
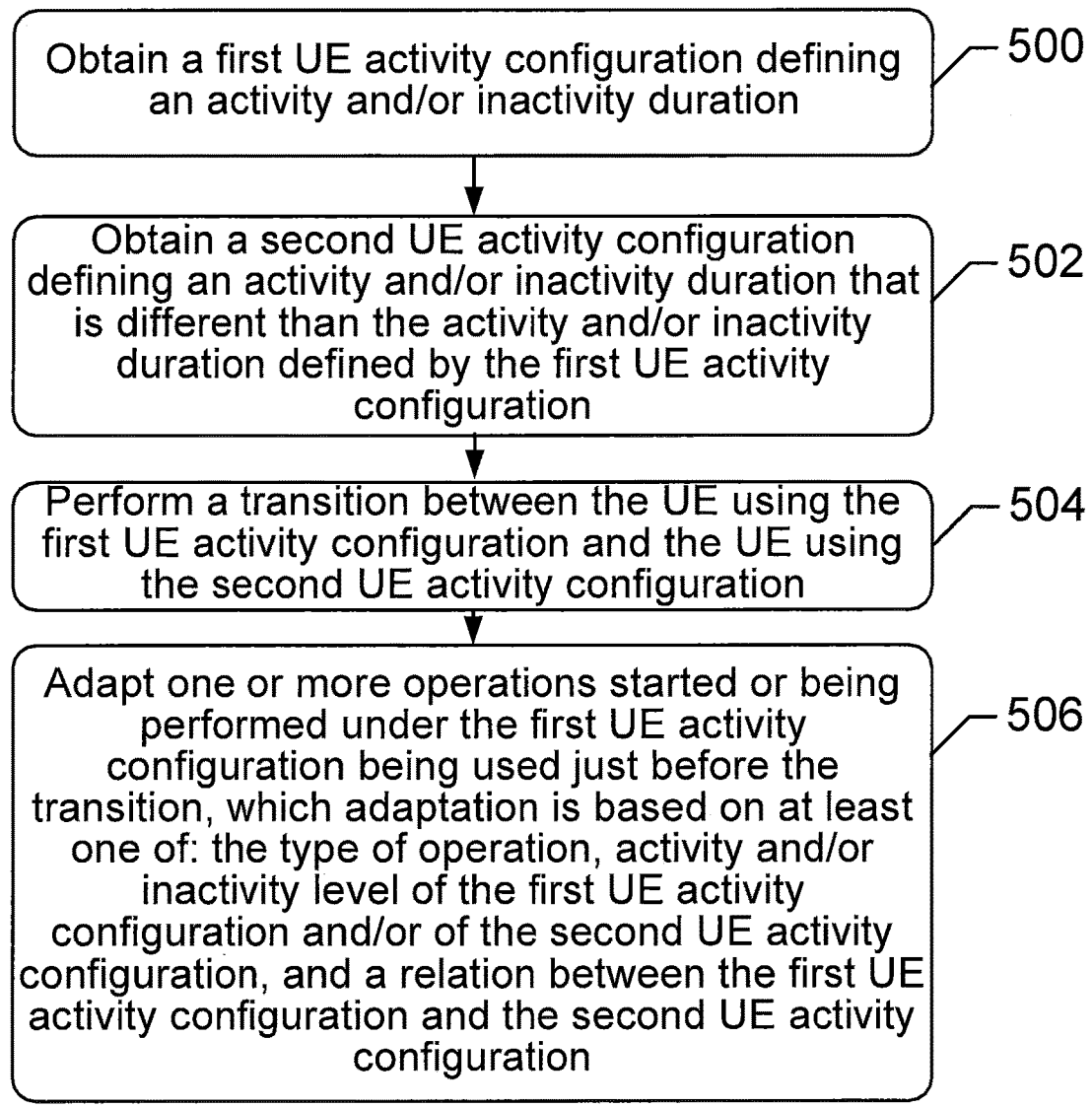
FIG. 5 illustrates a method in a UE and corresponding operations by a UE in accordance with some embodiments.

FIG. 5 illustrates a method in a UE and corresponding operations by a UE in accordance with some embodiments. Referring to FIG. 5, the method in a UE can include obtaining (block 500) a first UE activity configuration (e.g. DRX cycle 1). The method can further include obtaining (block 502) a second UE activity configuration (e.g. DRX cycle 2), wherein an activity and/or inactivity duration defined by the second activity configuration is different than an activity and/or inactivity duration defined by the first activity configuration. The method can further include performing (block 504) a transition between the UE using the first UE activity configuration and the UE using the second UE activity configuration, and adapting (block 506) one or more operations started or being performed during the UE activity configuration being used just before the transition, which adaptation is based on at least one of: the type of operation, activity and/or inactivity level of the first UE activity configuration and/or of the second UE activity configuration, and a relation between the first UE activity configuration and the second UE activity configuration.

The UE may receive the first and/or second activity configurations via signaling from a network node or another node, or may determine the first and/or second activity configurations based on information stored in a memory of the UE.

Figure 6:
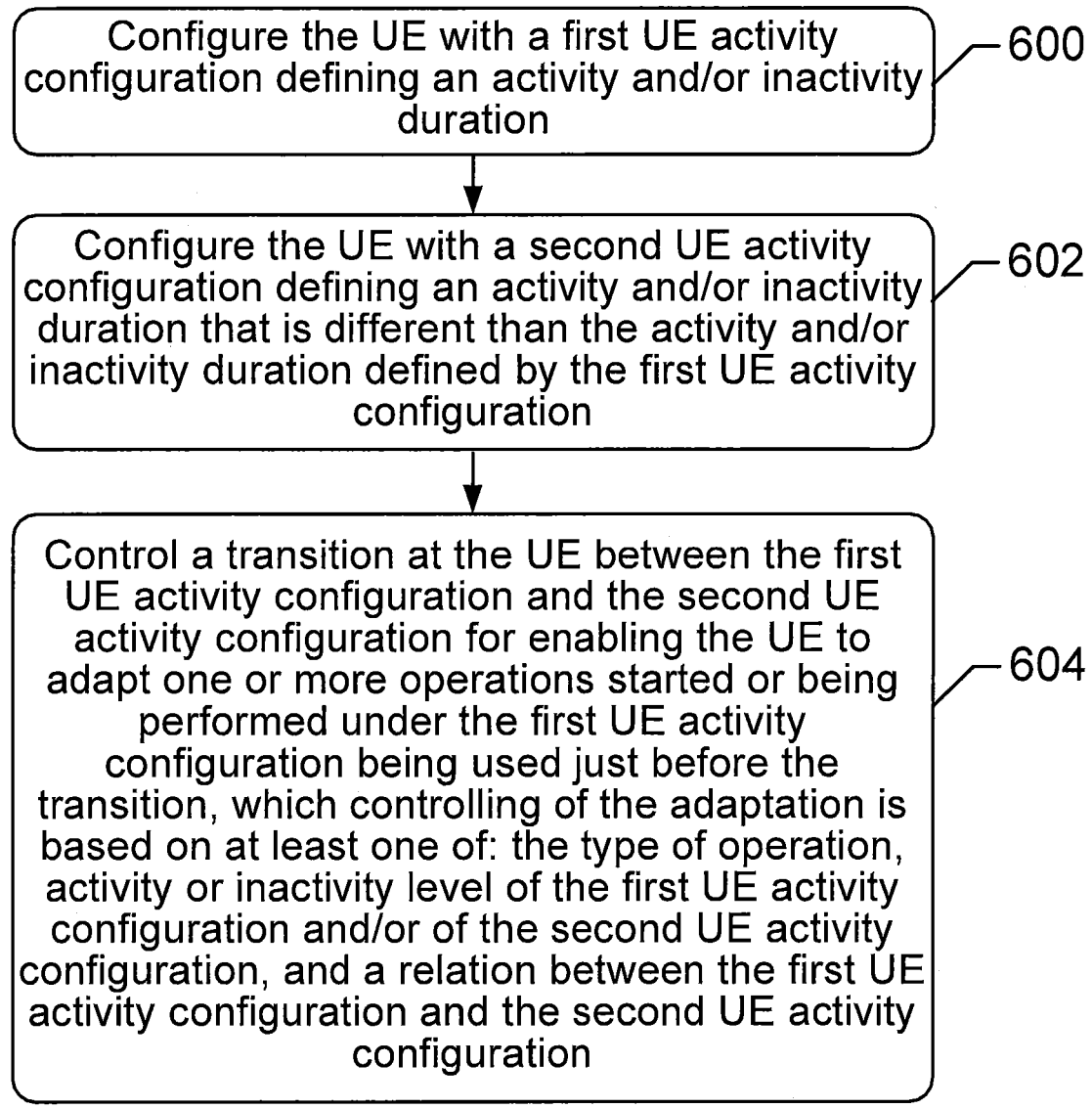
FIG. 6 illustrates a method in a network node and corresponding operations by a network node in accordance with some embodiments.

FIG. 6 illustrates a method in a network node and corresponding operations by a network node in accordance with some embodiments. Referring to FIG. 6, the method in a network node serving a UE can include configuring (block 600) the UE with a first UE activity configuration (e.g. DRX cycle 1). The method can further include configuring (block 602) the UE with a second UE activity configuration (e.g. DRX cycle 2). An activity and/or inactivity duration defined by the second activity configuration is different than an activity and/or inactivity duration defined by the first UE activity configuration. For example, the activity and/or inactivity duration defined by the first UE activity configuration can be less than the activity and/or inactivity duration defined by the second UE activity configuration. The method can further include controlling (block 604) a transition at the UE between the first UE activity configuration and the second UE activity configuration for enabling the UE to adapt one or more operations started or being performed during the UE activity configuration being used just before the transition, which adaptation is based on at least one of: the type of operation, activity or inactivity level of the first UE activity configuration and/or of the second UE activity configuration, and a relation between the first UE activity configuration and the second UE activity configuration.

The first UE activity configuration may correspond to any one or more of: 1) a different DRX cycle length than the second UE activity configuration; 2) a different eDRX cycle length than the second UE activity configuration; 3) a different activity cycle length than the second UE activity configuration; and 4) a different ON DURATION time than the second UE activity configuration.

5. Potential Advantages of Various Embodiments

Methods according to one or more of the embodiments disclosed herein may allow a network node (e.g. serving network node) to be aware of UE activity level and performance when doing transition from one UE activity configuration to another UE activity configuration. The methods may ensure that the UE meets at least certain performance requirements of one or more operations occurring during, before or after transition from one UE activity configuration to another UE activity configuration. The methods may ensure consistent UE behavior related to one or more operations occurring during, before or after the transition from one UE activity configuration to another UE activity configuration. Data transmitted to the UE and/or transmitted by the UE may thereby not be lost or the loss can be minimized during, before or after the transition from one UE activity configuration to another UE activity configuration.

6. Generalizations

In some embodiments a non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

Also in some embodiments generic terminology, "radio network node" or simply "network node (NW node)", is used and can be any kind of node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc.

The term 'radio node' used herein may be used to denote a UE or a radio network node.

Embodiments disclosed herein are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

7. Operations and Methods by UEs and Network Nodes

Herein, a UE operation that can be performed under the first and/or the second UE activity configuration may comprise, e.g., any operation that can be performed by the UE for receiving and/or transmitting one or more signals from and/or to a cell. The UE operation may, for example, be a radio operation, a radio operation task, an operational task, a signal processing task, etc. Examples operations are performing one or more of: a measurement (e.g., any of the measurements specified in TS 36.214 or TS 25.215), a bunch of measurements (e.g., intra-frequency measurements for more than one cell, inter-frequency measurements over more than one carrier, etc.), CQI reporting, radio link monitoring (RLM), cell search, cell selection or reselection, paging reception, acquisition of system information, handover, receiving a radio signal or channel or a physical signal, transmitting a radio signal or channel, etc. Specific examples of measurements are RSRP, RSRQ, UE Rx-Tx time difference, RSTD, SINR, SNR, cell global ID (CGI) or E-UTRA CGI (ECGI) identification delay, GSM carrier RSSI, IEEE 802.11 Beacon RSSI, CPICH RSCP, CPICH Ec/No, etc. Specific examples of channels are PDCCH, PDSCH, E-PDCCH, M-PDCCH, M-PDSCH, etc. Specific examples of physical signals are reference signals (RS) like discovery RS (DRS), CRS, CSI-RS, PSS/SSS, etc.

UE activity configuration may comprise herein one or more parameters characterizing UE activity, e.g., activity cycle length, DRX cycle length, eDRX cycle length, ON DURATION time, etc.

In one embodiment, the method by the UE includes operating the UE to provide a different DRX cycle length while the UE is using the first UE activity configuration than while the UE is using the second UE activity configuration.

In another embodiment, the method by the UE includes operating the UE to provide a different eDRX cycle length while the UE is using the first UE activity configuration than while the UE is using the second UE activity configuration.

In another embodiment, the method by the UE includes controlling the cycle length based on a capability of the UE to combine measurement samples or snapshots obtained in two successive ON durations or paging windows and use the combined results for one or more operations.

In another embodiment, the method by the UE includes operating the UE to provide a different activity cycle length while the UE is using the first UE activity configuration than while the UE is using the second UE activity configuration.

In another embodiment, the method by the UE includes operating the UE to provide a different ON DURATION time while the UE is using the first UE activity configuration than while the UE is using the second UE activity configuration.

Herein, it is assumed that the UE can be configured with at least a first UE activity configuration (also referred to herein as UE activity configuration 1) and at least a second UE activity configuration (also referred to herein as UE activity configuration 2). The UE may be configured with the first and the second activity configurations in parallel (e.g. in the same configuration) or in tandem, e.g. over successive or non-overlapping time. The two UE activity configurations differ with respect to their activity level and/or inactivity level and/or total cycle length in time (i.e. sum of activity and inactivity durations) during each period comprising of activity duration (e.g. ON duration) and inactivity duration (e.g. OFF duration). The UE may also be configured with more than two UE activity configurations. Examples of the first and the second activity configurations are legacy DRX cycle and eDRX cycle.

For example assuming two levels of UE activity configurations, the UE operates according to the following:
  operates in the first UE activity configuration if the inactivity duration in each period is less' than or equal to a first inactivity threshold; and
  operates in the second UE activity configuration if the inactivity duration in each period is larger than the first inactivity threshold.

In another example, also assuming two levels of UE activity configurations, the UE operates according to the following:
  operates in the first UE activity configuration if the activity duration in each period is less than or equal to a first activity threshold; and
  operates in the second UE activity configuration if the activity duration in each period is larger than the first activity threshold.

In yet another example, also assuming two levels of UE activity configurations, the UE operates according to the following:
  operates in the first UE activity configuration if the total duration (i.e. sum of activity and inactivity durations) of each period is less than or equal to a first total threshold; and
  operates in the second UE activity configuration if the total duration (i.e. sum of activity and inactivity durations) of each period is larger than the first total threshold.

In yet another example, assuming the UE activity being DRX cycle and assuming two levels of UE activity configurations the UE operates according to the following:
  operates in a first DRX cycle (aka legacy DRX) if the length of the DRX cycle is less than or equal to a first DRX threshold; and
  operates in a second DRX cycle (aka eDRX) if the length of the DRX cycle is larger than the first DRX threshold.

In some embodiments, at least one of the first and second UE activity configurations comprises two different levels of activity configuration. While under one of the first and second UE activity configurations, the UE may operate with an eDRX cycle while under one level of activity configuration, and operate with a DRX cycle within a PTW in each eDRX_IDLE cycle while under the other level of activity configuration. The other one of the first and second UE activity configuration may be a no-DRX configuration, a DRX configuration, or an eDRX configuration having two different levels of activity configuration. The two different levels of activity configuration may be for a UE in CONNECTED mode or in IDLE mode. In another embodiment, the two different levels of activity configuration respectively cause the UE to operate in an eDRX cycle with different DRX cycle length depending upon which of the two levels of activity configuration is being used.

In some embodiments, the first UE activity configuration may also be regarded as full activity configuration e.g. non-DRX configuration or continuous UE transceiver operation, etc.

In one example embodiment, the first DRX threshold can be 5.12 seconds. In another example embodiment, the first DRX threshold can be 10.24 seconds. The first DRX threshold may be different or the same for the UE operating in idle state and connected state. The first DRX cycle threshold may also depend on the capability of the UE to combine or average measurement samples or snapshots obtained in two successive ON durations or paging windows and use the combined results for one or more operations.

Examples of operations are radio measurements, time and/or frequency synchronization or tracking, channel estimation, estimation of Doppler etc. For example if the UE can average at least two measurement samples of reference signals received from the serving cell during two successive ON durations or paging window of a DRX cycle of length 10.24 seconds then this DRX cycle is called herein as legacy DRX or simply DRX or the first DRX cycle.

In another example if the UE cannot average measurement samples of reference signals received from the serving cell during two successive ON durations or paging windows of a DRX cycle of length 20.48 seconds then this DRX cycle is called herein as extended DRX or the second DRX cycle. The inability to average samples across successive activity duration (e.g. paging windows) in a meaningful manner stems from the fact that such samples are very largely separated in time making them highly uncorrelated. For example, during the long duration the UE location may change and/or radio conditions may change substantially. For example the impact of shadow fading may become very severe such as difference in shadow fading between two successive samples may become as large as 10 dB.

Furthermore when the successive ON durations or corresponding samples are very widely separated in time then the UE may have to store the samples (e.g. soft samples without decoding) over very long duration. This puts additional constraint in terms of requiring more memory and/or processing resources in the UE. Therefore the first UE activity or first DRX cycle threshold may also depend on the UE implementation and may vary from one UE to another. However typically for the sake of consistency the threshold may be pre-defined and/or configured by the network node.

Herein the terms "periodicity" and "cycle" may be used interchangeably.

8. Transitions Between Different Activity Configurations

A transition is changing from UE activity configuration 1 to UE activity configuration 2 or vice versa. The following example scenarios are considered here:
1. DRX has changed to eDRX, e.g., the cycle length has changed to a cycle longer than 2.56 sec;
2. eDRX has changed to DRX i.e. UE activity configuration 2 to UE activity configuration 1;
3. non-DRX has changed to eDRX i.e. UE activity configuration 1 to UE activity configuration 2;
4. eDRX has changed to non-DRX i.e. UE activity configuration 2 to UE activity configuration 1;
5. ON DURATION length has changed to beyond an ON threshold;
6. OFF duration length has changed beyond an OFF threshold;
7. Relation between ON and OFF duration lengths have changed beyond ON-OFF threshold. An example of the relation between ON and OFF duration lengths can be a ratio of ON to OFF durations or vice versa;
8. Relation between ON duration length and DRX cycle length has changed beyond ON-DRX threshold. An example of the relation between the ON duration length and DRX cycle length can be a ratio of ON duration to DRX cycle length or vice versa;
9. Relation between OFF duration length and DRX cycle length has changed beyond OFF-DRX threshold. An example of the relation between the OFF duration length and DRX cycle length can be a ratio of OFF duration to DRX cycle length or vice versa; and
10. The difference between UE activity configuration 1 and UE activity configuration 2 is above a threshold, e.g., abs(cycle2-cycle1)>threshold and/or abs (ON_duration_length1−ON_duration_length2)>threshold.

9. Methods in a UE of Operating at a Transition Between Two Activity Configurations 9.1 Transition Between UE Activity Configuration 1 and UE Activity Configuration 2

The following embodiments are mainly described for transition from UE activity configuration 1 to UE activity configuration 2. The phrase "UE activity configuration 1" in used interchangeably herein with "first UE activity configuration." Similarly, the phrase "UE activity configuration 2" in used interchangeably herein with "second UE activity configuration." The following embodiments and the associated rules disclosed herein are also applicable for the transition from UE activity configuration 2 to the UE activity configuration 1.

A UE being configured with the UE activity configuration 1 performs the following steps:
Step 1: Obtain (via signaling from another node or based on pre-defined information) or determine UE activity configuration 2
Step 2: Perform a transition from UE activity configuration 1 to UE activity configuration 2, the transition further comprising adapting at least one or more UE radio operations started under the UE activity configuration 1 and configuring UE activity configuration 2.

The adapting may further comprise one or more of:
Delaying by a time period, DELTA1, the configuring of the UE activity configuration 2 to enable the UE to complete at least one on-going operation started under UE activity configuration 1;
Delaying by a time period, DELTA2, the configuring of the UE activity configuration 2 based on determining that due to reconfiguration to the UE activity configuration 2, the UE cannot meet one or more pre-defined requirements associated with at least one on-going operation started under UE activity configuration 1. Examples of pre-defined requirements are measurement accuracy (e.g. ±2 dB) for RSRP measurement;
Reconfiguring the UE with the UE activity configuration 2 based on determining that the UE can meet one or more pre-defined requirements associated with at least one on-going operation started under UE activity configuration 1 regardless of when the operation started, e.g. even if the operation is not completed over a pre-defined or configurable duration. For example the pre-defined duration of RSRP measurement can be 200 ms while the operation (RSRP measurement) has lasted over only 150 ms;
Continuing the measurement started under UE activity configuration 1 also after configuring the UE activity configuration 2; e.g., when a DRX or eDRX cycle of the UE activity configuration 2 is less than a define threshold value.
Dropping at least one measurement or operation task started under UE activity configuration 1 while starting UE operation under UE activity configuration 2, e.g., when
the sample accumulation or combining over multiple consecutive activity occasions (e.g. 2 or more ON durations) is not possible under UE activity configuration 2 (e.g., when a DRX or eDRX cycle of the UE activity configuration 2 is less than a define threshold value)
Reporting at least one measurement with a worse quality due to configuring the UE activity configuration 2, e.g., because of a reduced number of samples or longer sample periodicity:
The measurement report may further comprise an indication of a reduced measurement quality or ss (e.g., signal strength) or amount of degradation of the measurement quality, e.g., number of samples, an indication that the measurement has been completed in a best effort with a worse accuracy, measurement accuracy of signal measurement (e.g. RSRP) is 2 dB worse than the pre-defined accuracy, timing accuracy of timing measurement (e.g. UE Rx-Tx time difference) is 5 Ts (1 Ts=32.55 ns) worse than the pre-defined timing accuracy, etc.
Reporting a measurement started under UE activity configuration 1 based on the number of samples used for the measurement (i.e. samples used for averaging) being above a threshold or the current quality being above a threshold, and otherwise not reporting the measurement;
Reconfiguring the UE with the UE activity configuration 2 only during a specific time period (T1) within the duration of the UE activity configuration 1. For example reconfiguring the UE with the eDRX cycle only during the OFF duration of the legacy DRX cycle. The rule can be pre-defined or configured by the network node. The specific time period may be pre-defined or configured by the network node;

Not reconfiguring the UE with the UE activity configuration 2 during a specific time period (T2) within the duration of the UE activity configuration 1. For example not reconfiguring the UE with the eDRX cycle during the ON duration of the legacy DRX cycle or not during certain part of the ON duration e.g., not during the initial 10% of the ON duration or initial 10 ms of the ON duration. The rule can be pre-defined or configured by the network node. The specific time period (T2) may be pre-defined or configured by the network node;

Transition between UE activity configurations is allowed during a specific time period (T3) of the UE activity cycle provided that the length of T3 is longer than a threshold. Example of T3 is ON duration of DRX cycle. As an example T3 can be 20 ms;

Transition between UE activity configurations is allowed during a paging window of the UE activity cycle provided that during the paging window there is at least N number of DRX cycles. Example of N is 5 DRX cycles in paging window;

Transition between UE activity configurations is allowed during a paging window (Pw) of the UE activity cycle provided that during the Pw there is at least K number of DRX cycles and/or each DRX cycle length (T4) in the (Pw) is less than or equal to certain threshold. Example of K is 10 DRX cycles and T4 is 80 ms;

Not reconfiguring the UE with the UE activity configuration 2 during a specific time period (T5) over which the UE traffic buffer size is above threshold i.e. UE waits until the current data is transmitted by the UE and/or received by the UE.

Thus, in one embodiment, the method by the UE adapts one or more operations started or being performed under the first UE activity configuration being used just before the transition, by delaying by a defined time period the configuring of the second UE activity configuration to enable the UE to complete at least one on-going operation started under the first UE activity configuration.

In another embodiment, the method by the UE adapts one or more operations started or being performed under the first UE activity configuration being used just before the transition, by delaying by a defined time period the configuring of the second UE activity configuration based on determining that due to reconfiguration to the second UE activity configuration, the UE cannot meet one or more pre-defined requirements associated with at least one on-going operation started under the first UE activity configuration.

In another embodiment, the method by the UE adapts one or more operations started or being performed under the first UE activity configuration being used just before the transition, by reconfiguring the UE with the second UE activity configuration based on determining that the UE can meet one or more pre-defined requirements associated with at least one on-going operation started under the first UE activity configuration regardless of when that at least operation started.

In another embodiment, the method by the UE adapts one or more operations started or being performed under the first UE activity configuration being used just before the transition, by continuing a measurement started under the first UE activity configuration after configuring the second UE activity configuration.

In another embodiment, the method by the UE adapts one or more operations started or being performed under the first UE activity configuration being used just before the transition, by dropping at least one measurement or operation task started under the first UE activity configuration while starting UE operation under the second UE activity configuration.

In another embodiment, the method by the UE drops at least one measurement or operation task started under the first UE activity configuration while starting UE operation under the second UE activity configuration, by performing the dropping based on determining that sample accumulation or combining over multiple consecutive activity occasions is not possible under the second UE activity configuration.

In another embodiment, the method by the UE adapts one or more operations started or being performed under the first UE activity configuration being used just before the transition, by reporting at least one measurement with a worse quality due to configuring the second UE activity configuration.

In another embodiment, the method by the UE adapts one or more operations started or being performed under the first UE activity configuration being used just before the transition, by: 1) reporting a measurement started under the first UE activity configuration based on the number of samples used for the measurement being above a threshold or the current quality being above a threshold; and 2) not reporting the measurement started under the first UE activity configuration based on the number of samples used for the measurement being not above the threshold or the current quality not being above the threshold.

In another embodiment, the method by the UE adapts one or more operations started or being performed under the first UE activity configuration being used just before the transition, by not reconfiguring the UE with the second UE activity configuration during a specific time period within the duration of the first UE activity configuration.

In another embodiment, the method by the UE adapts one or more operations started or being performed under the first UE activity configuration being used just before the transition, by transitioning between the first and second UE activity configurations only during a specific time period of a UE activity cycle provided that a length of the specific time period is longer than a defined threshold.

In another embodiment, the method by the UE adapts one or more operations started or being performed under the first UE activity configuration being used just before the transition, by transitioning between the first and second UE activity configurations only during a paging window of a UE activity cycle provided that during the paging window there is at least N number of DRX cycles.

In another embodiment, the method by the UE adapts one or more operations started or being performed under the first UE activity configuration being used just before the transition, by transitioning between the first and second UE activity configurations only during a paging window of the UE activity cycle provided that during the paging window there is at least a defined number of DRX cycles and/or each DRX cycle length in the paging window is less than or equal to a defined threshold.

In another embodiment, the method by the UE adapts one or more operations started or being performed under the first UE activity configuration being used just before the transition, by not reconfiguring the UE with the second UE activity configuration during a specific time period over which a UE traffic buffer size is above a defined threshold.

9.2 Meeting Requirements During or after Transition Between the UE Activity Configurations 1 and 2

The following embodiment is mainly described for transition from UE activity configuration 1 to UE activity configuration 2. However this embodiment and the associated requirements disclosed herein are also applicable for the transition from UE activity configuration 2 to the UE activity configuration 1.

The performing of the adaptation procedure may also be required to meet a certain requirement associated with the transition, e.g.:
- A UE operating under UE activity configuration 1 and then further configured with UE activity configuration 2, completes and reports at least one certain measurement under UE activity configuration 2 which was started under UE activity configuration 1, while
  - the reported measurement meets the most relaxed requirement out of the first requirement associated with UE activity configuration 1 and the second requirement associated with UE activity configuration 2. Examples of relaxed requirements are: a) measurement accuracy of RSRP worse than 2 dB compared to normal or tighter requirements; b) reporting measurement results for up to 4 cells instead of up to 8 cells over the same measurement period; c) the measurement period used by the UE while under the UE activity configuration 2 is longer than the measurement period used by the UE to perform radio measurements while under the UE activity configuration 1.
- A UE operating under UE activity configuration 1 and then further configured with UE activity configuration 2, completes and reports at least one certain measurement which was started under UE activity configuration 1, while
  - the reported measurement meets the first requirement associated with UE activity configuration 1 under which the measurement started.
  - This may mean that, if necessary, the UE postpones its configuration 2 to until it completes the operation task under configuration 1, unless the UE is capable of completing the operation task under configuration 2 and meet the requirement (more stringent) associated with configuration 1.

The embodiments herein may apply for UE in a specific activity state (e.g., RRC_CONNECTED or RRC_IDLE) or in any state.

10. Methods in a Network Node for Controlling at Least One UE Procedure at a Transition Between Two Activity Configurations The following embodiment is mainly described for transition from UE activity configuration 1 to UE activity configuration 2. However this embodiment and the associated requirements disclosed herein are also applicable for the transition from UE activity configuration 2 to the UE activity configuration 1.

Method in a network node comprising the steps of:
Step 1: configuring a UE with UE activity configuration 1.
Step 2: configuring the UE with UE activity configuration 2, while performing controlling the UE transition to UE activity configuration 2, to enable the UE to adapt one or more operations started or being performed under the UE activity configuration 1 being used just before the transition.

The controlling may apply to one, some, or all (under the cell coverage) UEs and may also involve unicast, multicast or broadcast physical or higher layer signaling.

The controlling may further comprise, e.g., any one or more of:
- Postponing configuring the UE with UE activity configuration 2, until the UE completes the operations(s) started under UE activity configuration 1;
- Configuring time DELTA, which may be signaled to the UE, by which the UE is allowed to delay the start of its operation under configuration 2.
- Sending to the UE a message indicative of that the UE does not need to report a measurement started under UE activity configuration 1;
- Postponing configuring the UE with UE activity configuration 2 during the time over which the UE traffic buffer size is above a certain threshold or configuring the UE with UE activity configuration 2 in case the UE traffic buffer size is below a certain threshold (e.g. no traffic in the buffer); the threshold may be signaled to the UE
- Prior to reconfiguring the UE to UE activity configuration 2, adapting one or more parameters associated with the currently configured UE activity configuration 2. Examples of parameters are ON duration length of the DRX cycle, length of Pw, etc.

Thus, in one embodiment, the method by the network node includes controlling a transition at the UE between the first UE activity configuration and the second UE activity configuration by postponing transitioning the UE to the second UE activity configuration until the UE completes one or more operations started or being performed under the first UE activity configuration.

In another embodiment, the method by the network node includes controlling a transition at the UE between the first UE activity configuration and the second UE activity configuration by communicating a defined time to the UE for which the UE is allowed to delay starting operation under the second UE activity configuration.

In another embodiment, the method by the network node includes controlling a transition at the UE between the first UE activity configuration and the second UE activity configuration by communicating to the UE a message indicating that the UE does not need to report a measurement started under the first UE activity configuration.

In another embodiment, the method by the network node includes controlling a transition at the UE between the first UE activity configuration and the second UE activity configuration by postponing transitioning the UE to the second UE activity configuration during a time over which a UE traffic buffer size is above a defined threshold and proceeding with transitioning the UE to the second UE activity configuration based on the UE traffic buffer size being below the defined threshold. The network node may furthermore communicate the defined threshold to the UE.

In another embodiment, the method by the network node includes controlling a transition at the UE between the first UE activity configuration and the second UE activity configuration by, prior to transitioning the UE to the second UE activity configuration, adapting one or more parameters associated with the second UE activity configuration.

Accordingly, various embodiments of the present disclosure can adapt a UE for performing a transition from a first UE activity configuration to a second UE activity configuration in a controlled way to ensure no or minimum performance loss or performance degradation. The adaptation may be controlled by the UE and/or by a network node.

11. Example User Equipment and Network Node

Figure 7:
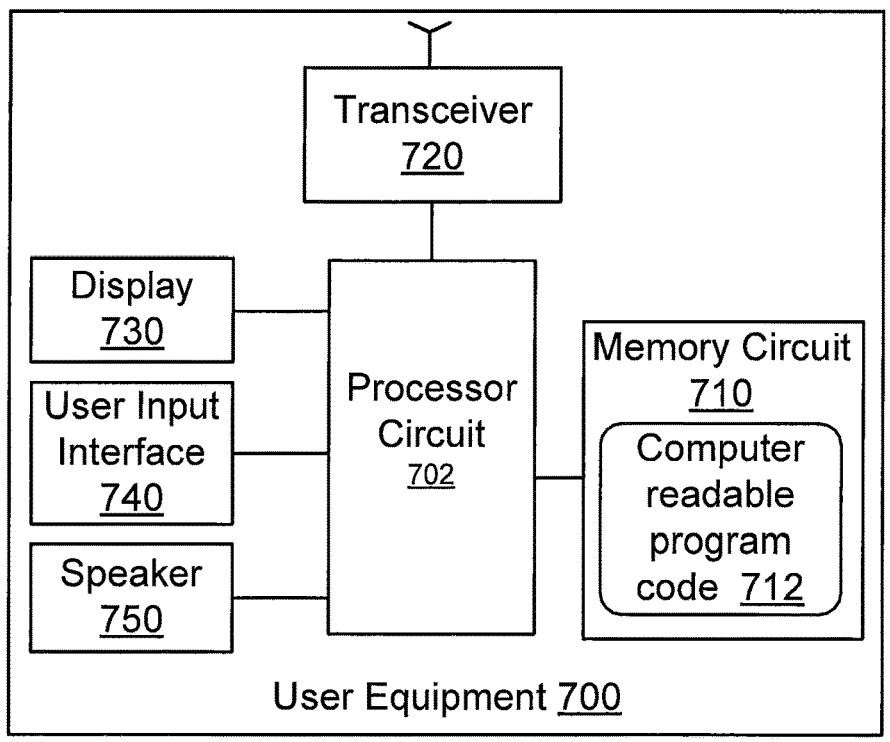
FIG. 7 is a block diagram of a UE, for use in a telecommunications system, that is configured to perform operations according to one or more embodiments disclosed herein.

FIG. 7 is a block diagram of a UE 700, for use in a telecommunications system, that is configured to perform operations according to one or more embodiments disclosed herein. The UE 700 includes a transceiver 720, a processor circuit 702, and a memory circuit 710 containing computer readable program code 712. The UE 700 may further include a display 730, a user input interface 740, and a speaker 750.

The transceiver 720 is configured to communicate with network nodes and may communicate with other UEs, through a wireless air interface using one or more of the radio access technologies disclosed herein. The processor circuit 702 may include one or more data processing circuits, such as a general purpose and/or special purpose processor, e.g., microprocessor and/or digital signal processor. The processor circuit 702 is configured to execute the computer readable program code 712 in the memory circuit 710 to perform at least some of the operations described herein as being performed by a UE.

Figure 8:
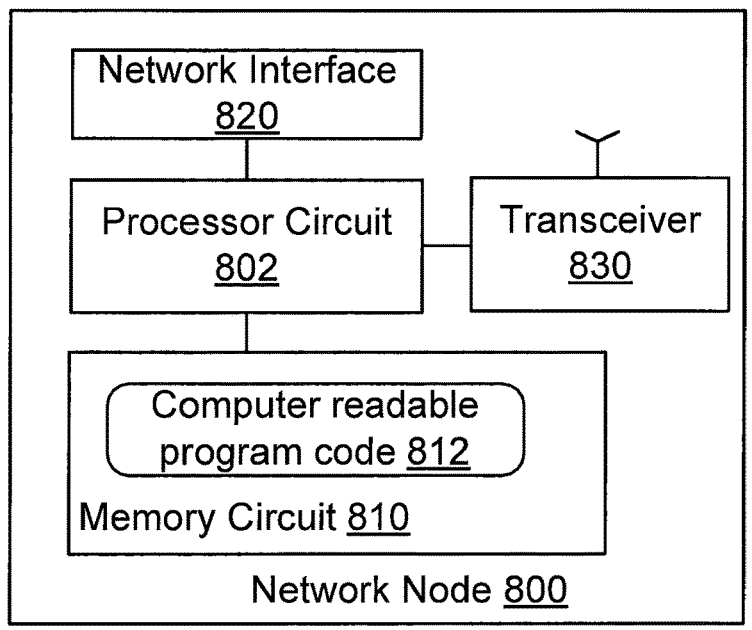
FIG. 8 is a block diagram of a network node, for use in a telecommunications system, that is configured according to one or more embodiments disclosed herein for a network node.

FIG. 8 is a block diagram of a network node 800, for use in a telecommunications system, that is configured according to one or more embodiments disclosed herein for a network node. The network node 800 can include a transceiver 830, a network interface 820, a processor circuit 802, and a memory circuit 810 containing computer readable program code 812.

The transceiver 830 is configured to communicate with the UE 700 using one or more of the radio access technologies disclosed herein, when the network node 800 is a radio network node. The processor circuit 802 may include one or more data processing circuits, such as a general purpose and/or special purpose processor, e.g., microprocessor and/or digital signal processor, that may be collocated or distributed across one or more networks. The processor circuit 802 is configured to execute the computer readable program code 812 in the memory 810 to perform at least some of the operations and methods of described herein as being performed by a network node. The network interface 820 communicates with other network nodes and/or a core network.

Figure 9:
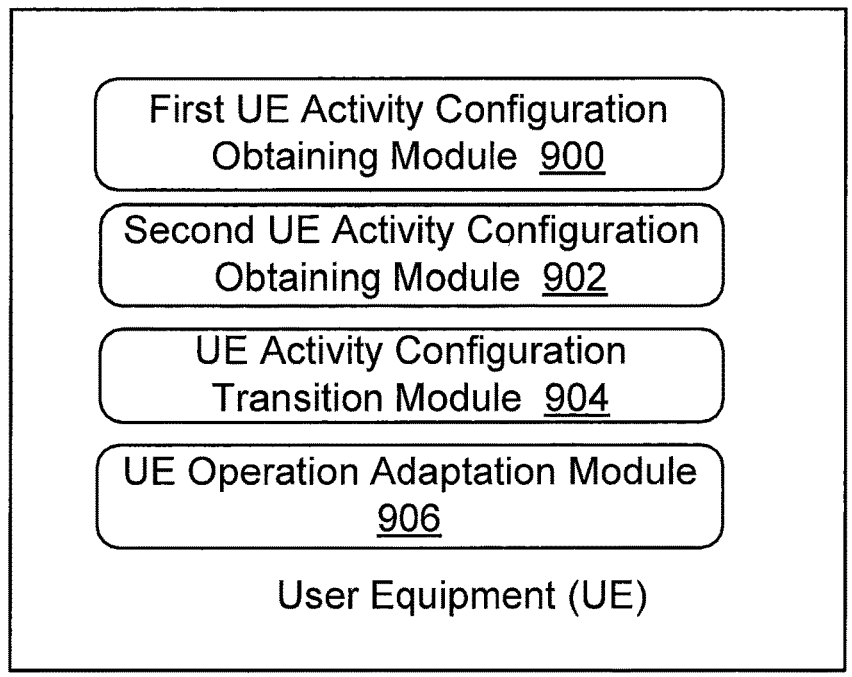
FIG. 9 illustrates modules residing in a UE, such as the UE of FIG. 7, that perform operations as disclosed herein according to some embodiments.

FIG. 9 illustrates modules residing in a UE, such as the UE 700 of FIG. 7, that perform operations as disclosed herein according to some embodiments. The UE includes a first UE activity configuration obtaining module 900, a second UE activity configuration obtaining module 902, a UE activity configuration transition module 904, and a UE operation adaptation module 906. The first UE activity configuration obtaining module 900 operates to obtaining a first UE activity configuration, wherein an activity and/or inactivity duration defined by the first UE activity configuration is less than or equal to a threshold. The second UE activity configuration obtaining module 902 operates to obtain a second UE activity configuration, wherein an activity and/or inactivity duration defined by the second activity configuration is not smaller than the threshold. The UE activity configuration transition module 904 operates to perform a transition between the first UE activity configuration and the second UE activity configuration. The UE operation adaptation module 906 operates to adapt one or more operations started or being performed under the first UE activity configuration being used just before the transition, which adaptation is based on at least one of: the type of operation, activity and/or inactivity level of the first UE activity configuration and/or of the second UE activity configuration, and the relation between the first UE activity configuration and the second UE activity configuration.

Figure 10:
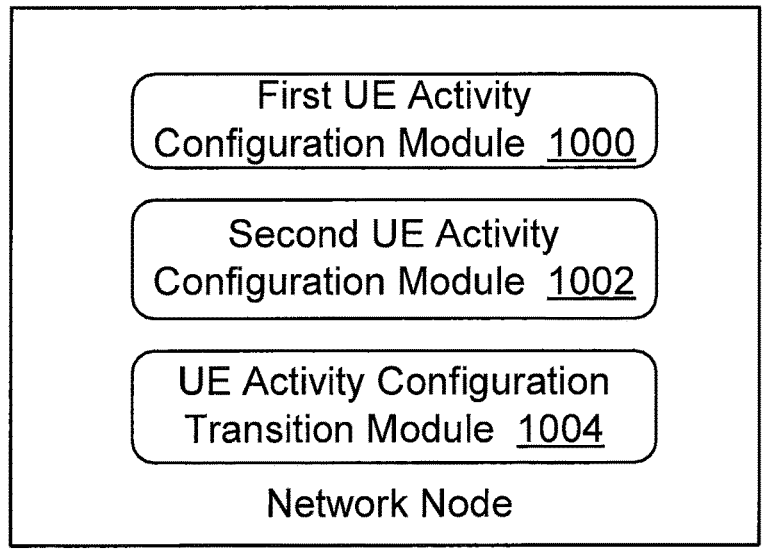
FIG. 10 illustrates modules residing in a network node, such as the network node of FIG. 8, that perform operations as disclosed herein according to some embodiments.

FIG. 10 illustrates modules residing in a network node, such as the network node 800 of FIG. 8, that perform operations as disclosed herein according to some embodiments. The network node includes a first UE activity configuration module 1000, a second UE activity configuration module 1002, and a UE activity configuration transition module 1104. The first UE activity configuration module 1000 operates to configure the UE (700) with a first UE activity configuration, wherein an activity and/or inactivity duration in the first UE activity configuration is less than or equal to a threshold. The second UE activity configuration module 1002 operates to configure the UE (700) with a second UE activity configuration, wherein an activity and/or inactivity duration in the second UE activity configuration is not smaller than the threshold. The UE activity configuration transition module 1104 operates to control a transition at the UE (700) between the first UE activity configuration and the second UE activity configuration for enabling the UE (700) to adapt one or more operations started or being performed under the first UE activity configuration being used just before the transition, which controlling of the adaptation is based on at least one of: the type of operation, activity or inactivity level of the first UE activity configuration and/or of the second UE activity configuration, and the relation between the first UE activity configuration and the second UE activity configuration.

12. Abbreviations

The following abbreviations are herewith defined, at least some of which are referred to within the following description of the present invention.

| Abbreviation | Meaning |
| --- | --- |
| 3GPP | 3$^{rd}$ Generation Partnership Project |
| BS | Base Station |
| CID | Cell ID (positioning method) |
| CRS | Cell-specific Reference Signal |
| CQI | Channel Quality Indicator |
| DL | Downlink |
| DRX | Discontinuous Reception |
| E-CID | Enhanced CID |
| eDRX | enhanced DRX or extended DRX |
| eNodeB | evolved Node B |
| E-SMLC | Evolved SMLC |
| H-SFN | Hyper-System Frame Number |
| HARQ | Hybrid ARQ, Hybrid Automatic Repeat Request |
| IE | Information Element |
| LTE | Long-Term Evolution |
| MAC | Medium Access Control |
| MDT | Minimization of Drive Tests |
| MSR | Multi-Standard Radio |
| OTDOA | Observed Time Difference of Arrival |
| PCI | Physical Cell Identity |
| PMI | Precoding Matrix Indicator |
| PTI | Precoding Type Indicator |
| PTW | Paging Transmission Window |
| PDCCH | Physical Downlink Control Channel |
| PUCCH | Physical Uplink Control Channel |
| PW | Paging Window |
| RF | Radio Frequency |
| RI | Rank Indication |
| RNTI | Radio Network Temporary Identity |
| RRC | Radio Resource Control |
| RSRP | Reference Signal Received Power |
| RSRQ | Reference Signal Received Quality |
| RSSI | Received Signal Strength Indicator |
| SINR | Signal-to-Interference Ratio |

| Abbreviation | Meaning |
|---|---|
| SON | Self-Optimized Network |
| SRS | Sounding Refence Signals |
| UE | User Equipment |
| UL | Uplink |
| UMTS | Universal Mobile Telecommunications System |

13. List of Various Embodiments

Embodiment 1

A method by a user equipment, UE, (700) of a telecommunications system. The method comprises: obtaining (500) a first UE activity configuration, wherein an activity and/or inactivity duration defined by the first UE activity configuration is less than or equal to a first threshold; obtaining (502) a second UE activity configuration, wherein an activity and/or inactivity duration defined by the second activity configuration is not smaller than a second threshold; performing (504) a transition between the first UE activity configuration and the second UE activity configuration; and adapting (506) one or more operations started or being performed during the first UE activity configuration being used just before the transition, which adaptation is based on at least one of: the type of operation, activity and/or inactivity level of the first UE activity configuration and/or of the second UE activity configuration, and the relation between the first UE activity configuration and the second UE activity configuration.

Embodiment 2

The method of Embodiment 1, further comprising controlling the UE (700) to provide a different DRX cycle length while the UE (700) is operating using the first UE activity configuration than while the UE (700) is operating using the second UE activity configuration.

Embodiment 3

The method of any of Embodiments 1 to 2, further comprising controlling the UE (700) to provide a different eDRX cycle length while the UE (700) is operating using the first UE activity configuration than while the UE (700) is operating using the second UE activity configuration.

Embodiment 4

The method of any of Embodiments 2 to 3, further comprising controlling the cycle length based on a capability of the UE (700) to combine measurement samples or snapshots obtained in two successive ON durations or paging windows and use the combined results for one or more operations.

Embodiment 5

The method of any of Embodiments 1 to 4, further comprising controlling the UE (700) to provide a different activity cycle length while the UE (700) is operating using the first UE activity configuration than while the UE (700) is operating using the second UE activity configuration.

Embodiment 6

The method of any of Embodiments 1 to 5, further comprising controlling the UE (700) to provide a different ON DURATION time while the UE (700) is operating using the first UE activity configuration than while the UE (700) is operating using the second UE activity configuration.

Embodiment 7

The method of any of Embodiments 1 to 6, wherein obtaining a second UE activity configuration, comprises receiving the second activity configuration via signaling from another node or from determining the second UE activity configuration based on information stored in a memory of the UE (700).

Embodiment 8

The method of any of Embodiments 1 to 7, wherein adapting one or more operations started or being performed during the first UE activity configuration being used just before the transition, comprises adapting one or more UE radio operations started under the first UE activity configuration and continued under the second UE activity configuration.

Embodiment 9

The method of any of Embodiments 1 to 8, wherein adapting one or more operations started or being performed during the first UE activity configuration being used just before the transition, comprises delaying by a defined time period the configuring of the second UE activity configuration to enable the UE (700) to complete at least one on-going operation started under the first UE activity configuration.

Embodiment 10

The method of any of Embodiments 1 to 9, wherein adapting one or more operations started or being performed during the first UE activity configuration being used just before the transition, comprises delaying by a defined time period the configuring of the second UE activity configuration based on determining that due to reconfiguration to the second UE activity configuration, the UE (700) cannot meet one or more pre-defined requirements associated with at least one on-going operation started under the first UE activity configuration.

Embodiment 11

The method of any of Embodiments 1 to 10, wherein adapting one or more operations started or being performed during the first UE activity configuration being used just before the transition, comprises reconfiguring the UE (700) with the second UE activity configuration based on determining that the UE (700) can meet one or more pre-defined requirements associated with at least one on-going operation started under the first UE activity configuration regardless of when that at least operation started.

Embodiment 12

The method of any of Embodiments 1 to 11, wherein adapting one or more operations started or being performed during the first UE activity configuration being used just before the transition, comprises continuing a measurement started under the first UE activity configuration after configuring the second UE activity configuration.

Embodiment 13

The method of any of Embodiments 1 to 12, wherein adapting one or more operations started or being performed during the first UE activity configuration being used just before the transition, comprises dropping at least one measurement or operation task started under the first UE activity configuration while starting UE operation under the second UE activity configuration.

Embodiment 14

The method of Embodiment 13, wherein dropping at least one measurement or operation task started under the first UE activity configuration while starting UE operation under the second UE activity configuration, comprises performing the dropping based on determining that sample accumulation or combining over multiple consecutive activity occasions is not possible under the second UE activity configuration.

Embodiment 15

The method of any of Embodiments 1 to 14, wherein adapting one or more operations started or being performed during the first UE activity configuration being used just before the transition, comprises reporting at least one measurement with a worse quality due to configuring the second UE activity configuration.

Embodiment 16

The method of any of Embodiments 1 to 15, wherein adapting one or more operations started or being performed during the first UE activity configuration being used just before the transition, comprises: 1) reporting a measurement started under the first UE activity configuration based on the number of samples used for the measurement being above a threshold or the current quality being above a threshold; and 2) not reporting the measurement started under the first UE activity configuration based on the number of samples used for the measurement being not above the threshold or the current quality not being above the threshold.

Embodiment 17

The method of any of Embodiments 1 to 16, wherein adapting one or more operations started or being performed during the first UE activity configuration being used just before the transition, comprises reconfiguring the UE (700) with the second UE activity configuration only during a specific time period within the duration of the first UE activity configuration.

Embodiment 18

The method of any of Embodiments 1 to 17, wherein adapting one or more operations started or being performed during the first UE activity configuration being used just before the transition, comprises not reconfiguring the UE (700) with the second UE activity configuration during a specific time period within the duration of the first UE activity configuration.

Embodiment 19

The method of any of Embodiments 1 to 18, wherein adapting one or more operations started or being performed during the first UE activity configuration being used just before the transition, comprises transitioning between the first and second UE activity configurations only during a specific time period of a UE activity cycle provided that a length of the specific time period is longer than a defined threshold.

Embodiment 20

The method of any of Embodiments 1 to 19, wherein adapting one or more operations started or being performed during the first UE activity configuration being used just before the transition, comprises transitioning between the first and second UE activity configurations only during a paging window of a UE activity cycle provided that during the paging window there is at least N number of DRX cycles.

Embodiment 21

The method of any of Embodiments 1 to 20, wherein adapting one or more operations started or being performed during the first UE activity configuration being used just before the transition, comprises transitioning between the first and second UE activity configurations only during a paging window of the UE (700) activity cycle provided that during the paging window there is at least a defined number of DRX cycles and/or each DRX cycle length in the paging window is less than or equal to a defined threshold.

Embodiment 22

The method of any of Embodiments 1 to 21, wherein adapting one or more operations started or being performed during the first UE activity configuration being used just before the transition, comprises not reconfiguring the UE (700) with the second UE activity configuration during a specific time period over which a UE traffic buffer size is above a defined threshold.

Embodiment 23

A user equipment, UE, (700) configured to perform the method of any of Embodiments 1-22.

Embodiment 24

A user equipment, UE, (700) operating in a telecommunications system. The UE (700) comprises: a transceiver (720) configured to provide radio communications with a network node (800) of the telecommunications system; and a processor (702) coupled to the transceiver (720). The processor (702) is configured to: obtain (500) a first UE activity configuration, wherein an activity and/or inactivity duration defined by the first UE activity configuration is less than or equal to a first threshold; obtain (502) a second UE activity configuration, wherein an activity and/or inactivity duration defined by the second activity configuration is not smaller than a second threshold; perform (504) a transition between the first UE activity configuration and the second UE activity configuration; and adapt (506) one or more operations started or being performed during the first UE activity configuration being used just before the transition, which adaptation is based on at least one of: the type of operation, activity and/or inactivity level of the first UE activity configuration and/or of the second UE activity configuration, and the relation between the first UE activity configuration and the second UE activity configuration.

Embodiment 25

A method by a network node (800) serving a user equipment, UE, (700) in a telecommunications system. The method comprises: configuring (600) the UE (700) with a first UE activity configuration, wherein an activity and/or inactivity duration in the first UE activity configuration is less than or equal to a first threshold; configuring (602) the UE (700) with a second UE activity configuration, wherein an activity and/or inactivity duration in the second UE activity configuration is not smaller than a second threshold; and controlling (604) a transition at the UE (700) between the first UE activity configuration and the second UE activity configuration for enabling the UE (700) to adapt one or more operations started or being performed during the first UE activity configuration being used just before the transition, which controlling of the adaptation is based on at least one of: the type of operation, activity or inactivity level of the first UE activity configuration and/or of the second UE activity configuration, and the relation between the first UE activity configuration and the second UE activity configuration.

Embodiment 26

The method of Embodiment 25, wherein the first UE activity configuration corresponds to a different DRX cycle length than the second UE activity configuration.

Embodiment 27

The method of any of Embodiments 25 to 26, wherein the first UE activity configuration corresponds to a different eDRX cycle length than the second UE activity configuration.

Embodiment 28

The method of any of Embodiments 25 to 27, wherein the first UE activity configuration corresponds to a different activity cycle length than the second UE activity configuration.

Embodiment 29

The method of any of Embodiments 25 to 28, wherein the first UE activity configuration corresponds to a different ON DURATION time than the second UE activity configuration.

Embodiment 30

The method of any of Embodiments 25 to 29, wherein controlling a transition at the UE (700) between the first UE activity configuration and the second UE activity configuration for enabling the UE (700) to adapt one or more operations started or being performed during the first UE activity configuration being used just before the transition, comprises postponing transitioning the UE (700) to the second UE activity configuration until the UE (700) completes one or more operations started or being performed during the first UE activity configuration.

Embodiment 31

The method of any of Embodiments 25 to 30, wherein controlling a transition at the UE (700) between the first UE activity configuration and the second UE activity configuration for enabling the UE (700) to adapt one or more operations started or being performed during the first UE activity configuration being used just before the transition, comprises communicating a defined time to the UE (700) for which the UE (700) is allowed to delay starting operation under the second UE activity configuration.

Embodiment 32

The method of any of Embodiments 25 to 31, wherein controlling a transition at the UE (700) between the first UE activity configuration and the second UE activity configuration for enabling the UE (700) to adapt one or more operations started or being performed during the first UE activity configuration being used just before the transition, comprises communicating to the UE (700) a message indicating that the UE (700) does not need to report a measurement started under the first UE activity configuration.

Embodiment 33

The method of any of Embodiments 25 to 32, wherein controlling a transition at the UE (700) between the first UE activity configuration and the second UE activity configuration for enabling the UE (700) to adapt one or more operations started or being performed during the first UE activity configuration being used just before the transition, comprises postponing transitioning the UE (700) to the second UE activity configuration during a time over which a UE traffic buffer size is above a defined threshold and proceeding with transitioning the UE (700) to the second UE activity configuration based on the UE traffic buffer size being below the defined threshold.

Embodiment 34

The method of Embodiment 33, further comprising communicating the defined threshold to the UE (700).

Embodiment 35

The method of any of Embodiments 25 to 34, wherein controlling a transition at the UE (700) between the first UE activity configuration and the second UE activity configuration for enabling the UE (700) to adapt one or more operations started or being performed during the first UE activity configuration being used just before the transition, comprises prior to transitioning the UE (700) to the second UE activity configuration, adapting one or more parameters associated with the second UE activity configuration.

Embodiment 36

A network node (800) configured to perform the method of any of Embodiments 25 to 35.

Embodiment 37

A network node (800) serving a user equipment, UE, in a telecommunications system. The network node (800) comprises: a transceiver (830) configured to provide radio communications with the UE (700) of the telecommunications system; and a processor (802) coupled to the transceiver (830). The processor (802) is configured to: configure (600) the UE (700) with a first UE activity configuration, wherein an activity and/or inactivity duration in the first UE activity configuration is less than or equal to a first threshold; configure (602) the UE (700) with a second UE activity configuration, wherein an activity and/or inactivity duration in the second activity configuration is not smaller than a second threshold; and control (604) a transition at the UE (700) between the first UE activity configuration and the second UE activity configuration for enabling the UE (700) to adapt one or more operations started or being performed during the first UE activity configuration being used just before the transition, which controlling of the adaptation is based on at least one of: the type of operation, activity or inactivity level of the first UE activity configuration and/or of the second UE activity configuration, and the relation between the first UE activity configuration and the second UE activity configuration.

13. Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and sub combinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a user equipment (UE) of a telecommunications system, the method comprising:
   obtaining a first UE activity configuration;
   obtaining a second UE activity configuration, wherein an activity and/or inactivity duration defined by the first UE activity configuration is different than an activity and/or inactivity duration defined by the second activity configuration;
   performing a transition between the UE using the first UE activity configuration and the UE using the second UE activity configuration; and
   adapting one or more operations started or being performed under the first UE activity configuration being used just before the transition, which adaptation is based on at least one of: the type of operation, activity and/or inactivity level of the first UE activity configuration and/or of the second UE activity configuration, and a relation between the first UE activity configuration and the second UE activity configuration,
   wherein adapting one or more operations started or being performed under the first UE activity configuration being used just before the transition, comprises:
      delaying implementation of the second UE activity configuration until the UE completes at least one on-going operation that has determined to have started under the first UE activity configuration.

2. The method of claim 1, wherein the first UE activity configuration is an inactivity state, and the second UE activity configuration controls the UE to operate with an eDRX cycle.

3. The method of claim 1, wherein adapting one or more operations started or being performed under the first UE activity configuration being used just before the transition, comprises:
   during a defined time period while performing the transitioning of the UE between the first UE activity configuration and the second UE activity configuration, performing the one or more operations by the UE according to a most relaxed requirement out of a first requirement associated with the first UE activity configuration and a second requirement associated with the second UE activity configuration.

4. The method of claim 3, wherein adapting one or more operations started or being performed under the first UE activity configuration being used just before the transition, further comprises:
   following the defined time period, operating the UE according to the second requirement associated with the second UE activity configuration.

5. The method of claim 1, further comprising:
   operating the UE with an eDRX cycle while under the first UE activity configuration, and operating the UE with a DRX cycle within a paging transmission window in each eDRX_IDLE cycle while under the second UE activity configuration.

6. The method of claim 1, further comprising:
   operating the UE with non-DRX while the UE is using the first UE activity configuration.

7. The method of claim 1, further comprising:
   operating the UE to provide a different DRX cycle length or a different eDRX cycle length while using the first UE activity configuration than while using the second UE activity configuration.

8. The method of claim 1, further comprising:
   operating the UE to provide a different ON DURATION time while using the first UE activity configuration than while using the second UE activity configuration.

9. The method of claim 1, wherein adapting one or more operations started or being performed under the first UE activity configuration being used just before the transition, comprises:
   adapting a measurement period for the one or more operations; and
   delaying by a defined time period the configuring of the second UE activity configuration to enable the UE to complete at least one on-going operation started under the first UE activity configuration.

10. The method of claim 1, wherein adapting one or more operations started or being performed under the first UE activity configuration being used just before the transition, comprises:
    delaying by a defined time period the configuring of the second UE activity configuration based on determining that due to reconfiguration to the second UE activity configuration, the UE cannot meet one or more pre-defined requirements associated with at least one on-going operation started under the first UE activity configuration.

11. The method of claim 1, further comprising:
    reconfiguring the UE with the second UE activity configuration based on determining that the UE can meet one or more pre-defined requirements associated with at least one on-going operation started under the first UE activity configuration regardless of when that at least operation started.

12. A user equipment (UE) operating in a telecommunications system, the UE comprising:
    a transceiver configured to provide radio communications with a network node of the telecommunications system; and
    a processor coupled to the transceiver and configured to:
       obtain a first UE activity configuration;
       obtain a second UE activity configuration, wherein an activity and/or inactivity duration defined by the first UE activity configuration is different than an activity and/or inactivity duration defined by the second activity configuration;
       perform a transition between the UE using the first UE activity configuration and the UE using the second UE activity configuration; and
       adapt one or more operations started or being performed under the first UE activity configuration being used just before the transition, which adaptation is based on at least one of: the type of operation, activity and/or inactivity level of the first UE activity configuration and/or of the second UE activity configuration, and a relation between the first UE activity configuration and the second UE activity configuration, wherein the processor is further configured to adapt the one or more operations started or being performed under the first UE activity configuration being used just before the transition by:

delaying implementation of the second UE activity configuration until the UE completes at least one on-going operation that has determined to have started under the first UE activity configuration.

13. The UE of claim 12, wherein adapting one or more operations started or being performed under the first UE activity configuration being used just before the transition, comprises:

during a defined time period while performing the transitioning of the UE between the first UE activity configuration and the second UE activity configuration, performing the one or more operations by the UE according to a most relaxed requirement out of a first requirement associated with the first UE activity configuration and a second requirement associated with the second UE activity configuration.

14. A method by a network node serving a user equipment (UE) in a telecommunications system, the method comprising:

configuring the UE with a first UE activity configuration;
configuring the UE with a second UE activity configuration, wherein an activity and/or inactivity duration defined by the first UE activity configuration is different than an activity and/or inactivity duration defined by the second UE activity configuration; and
controlling a transition at the UE between the first UE activity configuration and the second UE activity configuration for enabling the UE to adapt one or more operations started or being performed under the first UE activity configuration being used just before the transition,
wherein controlling a transition at the UE between the first UE activity configuration and the second UE activity configuration, comprises:
postponing configuring the UE with the second UE activity configuration, until the UE completes the one or more operations started under the first UE activity configuration.

15. The method of claim 14, wherein the first UE activity configuration defines an inactivity state, and the second UE activity configuration defines an eDRX cycle.

16. The method of claim 14, wherein the first UE activity configuration and the second UE activity configuration define different DRX cycle lengths.

17. The method of claim 14, wherein the first UE activity configuration and the second UE activity configuration define different eDRX cycle lengths.

18. The method of claim 14, wherein the first UE activity configuration and the second UE activity configuration define different measurement accuracy requirements for signal measurement.

19. The method of claim 14, wherein the first UE activity configuration and the second UE activity configuration define different timing accuracy requirements for signal measurement.

20. The method of claim 14, wherein controlling a transition at the UE between the first UE activity configuration and the second UE activity configuration for enabling the UE to adapt one or more operations started or being performed under the first UE activity configuration being used just before the transition, further comprises:

communicating a defined time to the UE for which the UE is allowed to delay starting operation under the second UE activity configuration.

21. The method of claim 14, wherein controlling a transition at the UE between the first UE activity configuration and the second UE activity configuration for enabling the UE to adapt one or more operations started or being performed under the first UE activity configuration being used just before the transition, further comprises:

communicating to the UE a message indicating that the UE does not need to report a measurement started under the first UE activity configuration.

22. The method of claim 14, wherein postponing configuring the UE with the second UE activity configuration, comprises:

postponing transitioning the UE to the second UE activity configuration during a time over which a UE traffic buffer size is above a defined threshold and proceeding with transitioning the UE to the second UE activity configuration based on the UE traffic buffer size being below the defined threshold.

23. A network node serving a user equipment (UE) in a telecommunications system, the network node comprising:

a transceiver configured to provide radio communications with the UE of the telecommunications system; and
a processor coupled to the transceiver and configured to:
configure the UE with a first UE activity configuration;
configure the UE with a second UE activity configuration, wherein an activity and/or inactivity duration defined by the first UE activity configuration is different than an activity and/or inactivity duration defined by the second activity configuration; and
control a transition at the UE between the first UE activity configuration and the second UE activity configuration for enabling the UE to adapt one or more operations started or being performed under the first UE activity configuration being used just before the transition,
wherein the processor is further configured to control the transition at the UE between the first UE activity configuration and the second UE activity configuration by:
postponing configuring the UE with the second UE activity configuration, until the UE completes the one or more operations started under the first UE activity configuration.

* * * * *